2-(N-ACETYL-N-ACETOXYAMINO)ACETYL CHLORIDE
Original Filed June 29, 1965
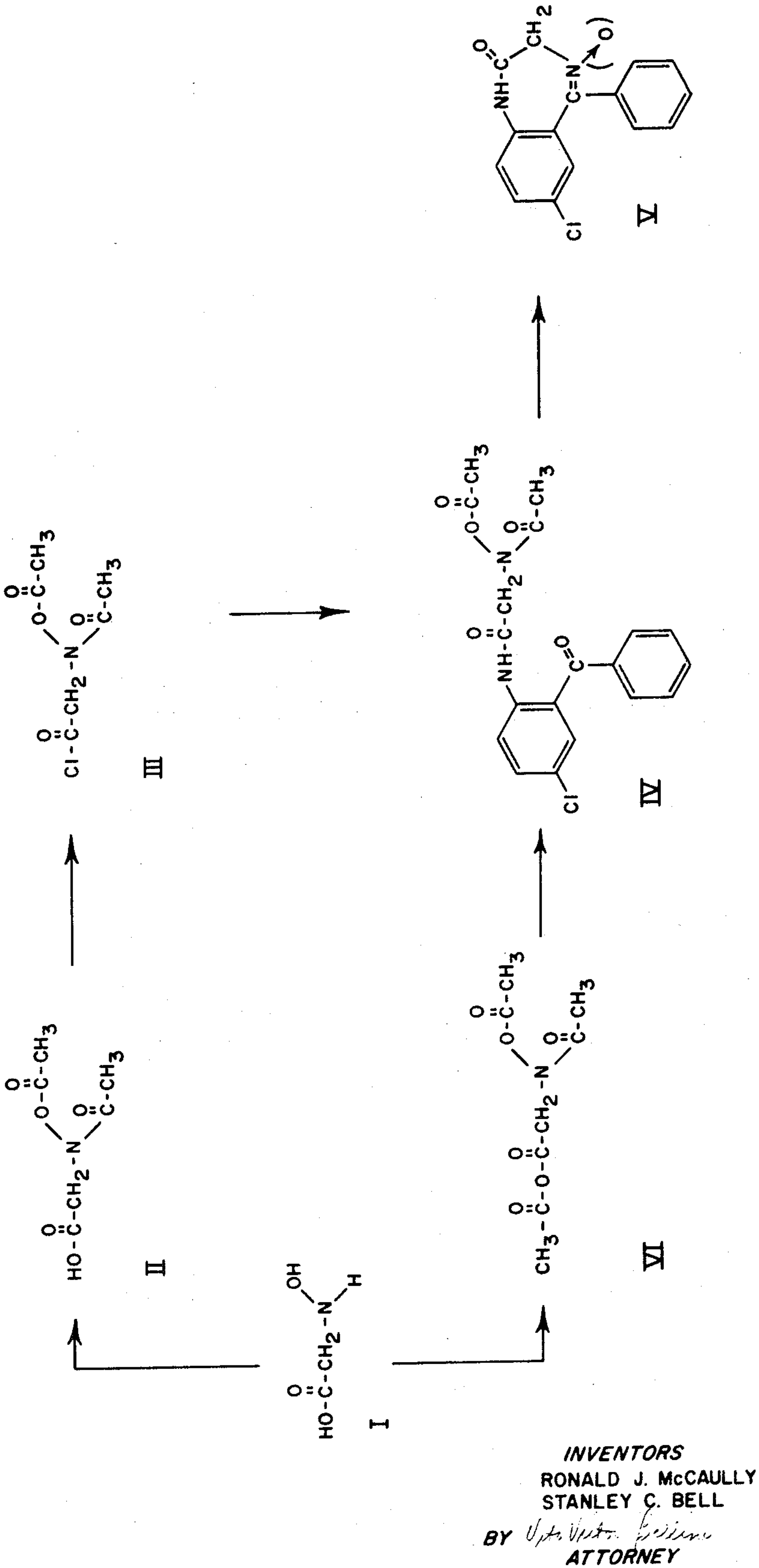
INVENTORS
RONALD J. McCAULLY
STANLEY C. BELL
BY [signature]
ATTORNEY United States Patent Office 3,632,644
Patented Jan. 4, 1972

1

3,632,644
2-(N-ACETYL-N-ACETOXYAMINO) ACETYL CHLORIDE

Ronald J. McCaully, Malvern, and Stanley C. Bell, Philadelphia, Pa., assignors to American Home Products Corporation, New York, N.Y.

Division of application Ser. No. 468,030, June 29, 1965. Continuation-in-part of application Ser. No. 395,807, Sept. 11, 1964. This application Oct. 14, 1969, Ser. No. 870,918
Int. Cl. C07c 101/04, 53/14
U.S. Cl. 260—544 Y 1 Claim This application is a division of U.S. Pat. application Ser. No. 468,030, filed June 29, 1965.

This application is a continuation-in-part of Ser. No. 395,807, filed Sept. 11, 1964.

This invention relates to process for making compositions of matter classified in the art of chemistry as substituted 2-aminophenyl aryl ketones and to intermediates for their production.

The invention sought to be patented in a principal process aspect residues in the concept of a sequence of reactions including: simultaneously replacing the hydrogen of the hydroxyl group attached to nitrogen, and the hydrogen directly attached to nitrogen in hydroxyaminoacetic acid with acetyl groups, replacing the hydroxyl group attached to carbonyl with a chlorine, and condensing the product so-obtained with 2-aminobenzophenone.

The invention sought to be patented in its principal composition aspect is described as residing in the concept of a chemical compound in which the hydrogen atom of the hydroxyl group attached to nitrogen and the hydrogen atom attached directly to the nitrogen atom of hydroxyaminoacetic acid, have been replaced with acetyl groups.

The tangible embodiments of the principal composition aspect of the invention, reveal upon infra-red spectrographic analysis, spectral data confirming the molecular structure hereinbefore set-forth. Thus the amide carbonyl, the ester carbonyl, and the acid carbonyl are evident. The aforementioned physical characteristics taken together with the nature of the starting material and the mode of synthesis positively confirms the structure of the composition sought to be patented.

The tangible embodiments of the invention possess the inherent applied use characteristic of being intermediates for the production of valuable 1,3 - dihydro - 5 - phenyl-2H - 1,4 - benzodiazepin-2-ones which have useful properties in that they are valuable for human medicinal uses, having demonstrated activity as anti-convulsants, sedatives, and muscle relaxants. Diazepam (acid commercially as Valium) is a compound having this structure. Moreover the specific compositions, 2 - [2-(N-acetoxyacetamido)acetamido] - 5 - chlorobenzophenone produced by the process of the invention, exhibits sedative activity when tested according to standard pharmacological procedures.

The invention sought to be patented in a second principal composition aspect is described as residing in the concept of a chemical compound in which the hydrogen atom of the hydroxyl group attached to nitrogen and the hydrogen atom attached directly to the nitrogen atom of hydroxyaminoacetic acid, have been replaced with acetyl groups and the hydroxyl group attached to carbonyl has been replaced with chlorine.

The tangible embodiments of the second principal composition aspect of the invention, reveal upon nuclear magnetic resonance analysis, spectral data confirming the molecular structure hereinbefore set forth. Thus the nuclear magnetic resonance spectrum is devoid of acidic protons. The aforementioned physical characteristic taken

2 together with the nature of the starting material and the mode of synthesis positively confirms the structure of the composition sought to be patented. The manner and process of making the invention will now be generally described, so as to enable a person skilled in the art of chemistry to make and use the same, as follows:

The new process of our invention is illustrated schematically, for a specific embodiment thereof in the drawing, to which the Roman numerals in parenthesis in the following description refer.

The preparation of the starting materials for the preparation of our invention is well known and is described in the chemical literatures.

Caution: Hydroxyaminoacetic acid and its low molecular weight derivatives such as 2-(N-acetyl-N-acetoxyamine)acetic acid and 2 - (N-acetyl-N-acetoxyamino)-acetyl chloride are unstable and their decomposition is auto-catalytic. In view of their hazardous nature care must be taken in handling them and the precautions known to those skilled in the art of explosives should be observed.

Acylation of hydroxyaminoacetic acid (I) with an excess of an acylating agent, such as, but not limited to acetic anhydride, acetyl chloride, isopropenyl acetate or keteno, under mild conditions, i.e. at from room temperatures to about 60–70° C., produces a compound in which the active hydrogen of the hydroxyl group attached to nitrogen and the active hydrogen attached directly to nitrogen are selectively replaced by acyl groups (II), thus serving to protect these otherwise reactive centers until a later stage in the over-all synthesis; more specifically 2-(N-acyl-N-acyloxyamino)acetic acid. The same result may be achieved under more strenuous conditions if an excess of acid corresponding to the acylating agent is used as a solvent; since the presence of such excess acid prevents the reaction from proceeding beyond the diacylation stage. The acylation also may be carried out in a solvent such as methylene chloride or 1,2-dimethoxyethane. If a solvent is used, it is apparent to one skilled in the art of organic chemistry that it should be one which will not itself react with the acylating agent. For optimum results however no solvent is necessary and the reaction is carried out under mild temperature conditions, i.e., the reaction mixture is heated to 50° C. and maintained at that temperature for approximately 15 minutes. While, as indicated, some heat is desirable for optimum yield, extended excessive heating will cause decomposition and should be avoided.

Unreacted acylating agent is removed by distillation under reduced pressure. The resulting residue is first dissolved in a medium which will not interfere with the subsequent reaction to replace hydroxy by a carboxyl activating group, such as methylene chloride or ethylene dichloride, and the N,N-diacylated-aminoacetic acid is treated with a reagent such as thionyl chloride, phosphorus pentachloride or phosphorus pentabromide, which will replace the hydroxyl group attached to carbonyl with a group which activates the carbonyl, such as the corresponding halide. The reaction mixture is permitted to reflux at the boiling point of the solvent in an atmosphere of nitrogen for about five minutes. The solvent and excess halogenating agent are removed under vacuum, and the residue, an N-acyloxy-N-acylacetyl halide (III), is added to 2-aminobenzophenone, preferably in a non-reactive solvent such as methylene chloride, benzene, or toluene, to produce 2-[N-acyl-N-acyloxyaminoacetamido]benzophenone (IV).

It will be apparent to one skilled in the art of organic chemistry that in addition to the method hereinbefore described, in which the 2-aminobenzophenone is reacted with 2-(N-acyl-N-acyloxyaminoacetyl)- halide, the same product is obtained if the N,N-diacylated-aminoacetic acid instead of being converted to the corresponding acyl halide, is condensed with the 2-aminobenzophenone in the presence of a condensing agent such as carbodiimide, ethoxyacetylene, and the like.

Alternatively, using excess acylating agent and more strenuous conditions, hydroxyaminoacetic acid is triacylated to produce a diacylated mixed anhydride, namely the mixed anhydride corresponding to the acylating agent used and 2-(N-acyl-N-acyloxyamino)acetic acid (VI). Reaction of this compound with 2-aminobenzophenone is as hereinbefore described for the corresponding acyl halide and acid. This alternative using a mixed anhydride however is less desirable because it is wasteful of aminobenzophenone.

It will be apparent from the disclosure herein, to those skilled in the art of organic chemistry, that for the purpose of this invention the protecting acyl group replacing the active hydrogen of the hydroxyl group attached to nitrogen and the active hydrogen directly attached to nitrogen of hydroxyaminoacetic acid, can be any acyl group which does not interefere with the course of the reaction. It can be, for example, as alkanoyl group, such as acetyl, propionoyl, or caproyl, an aroyl, such as benzoyl, naphthoyl, substituted benzoyl, an araliphatic carbonyl group, such as cinnamoyl, a heterocyclic carbonyl group, such as furoyl, pyridinoyl, tonyl group, a carbobenzoxy group, and the like. Such groups, when used for the purpose hereinbefore disclosed, are full equivalents of the invention as particularly claimed and described.

From the disclosure herein it will also be apparent to one skilled in the art of organic chemistry that the group activating the carbonyl can be any activating group which does not interfere with the course of the reaction. It can be, for example, chlorine, or another halogen such as bromine or it can be an acyloxy group formed from an acyl group such as those hereinbefore specifically named and the like. Such groups when used for the purposes hereinbefore disclosed are full equivalents of the invention as particularly claimed and described.

From the disclosure herein illustrating the invention as applied to 2-aminobenzophenones as starting materials, which produce compounds wherein the group attached to carbonyl other than 2-aminophenyl is phenyl, it will be apparent to organic chemists that any mono-heter monocyclic-aryl nuclei can be in the starting material in lieu of phenyl without affecting the course of the reactions. Accordingly, the starting materials wherein the phenyl group is replaced by a 2- or 3-thienyl; 2- or 3-furyl; 2-, 3-, or 4-pyridyl radical or phenyl substituted with groups such as halogen, trifluoromethyl, lower alkoxy, lower alkyl, and the like are full equivalents for the purposes of the invention.

The following example illustrates the best mode contemplated by the inventors of using the claimed process of the invention and of the manner of making and using a specific embodiment of the claimed compositions of the invention.

Caution: Hydroxyaminoacetic acid and its low molecular weight derivatives such as 2-(N-acetyl-N-acetoxyamino)acetic acid and 2-(N-acetyl-N-acetoxyamino) acetyl chloride are unstable and their decomposition is auto-catalytic. In view of their hazardous nature care must be taken in handling them and the precautions known to those skilled in the art of explosives should be observed.

EXAMPLE 1

Add hydroxyaminoacetic acid (1.00 g.) to 15 ml. of acetic anhydride and agitate under a nitrogen atmosphere for 15 minutes. Maintain the reaction mixture at 50° C. Filter to separate unreacted acid and remove the solvent from the filtrate until a yellow oil is obtained. Disperse the oil in a small amount of toluene and remove the toluene in vacuo to "toluene vapor"—distil off unreacted acetic anhydride. Repeat until crystalline 2-(N-acetyl-N-acetoxyamino)-acetic acid is obtained. Dissolve the acid in a solution of 3 ml. of thionyl chloride in 10 ml. of methylene chloride. Heat the solution for 5 minutes at reflux temperature in a nitrogen atmosphere. Remove the solvent and excess thionyl chloride by evaporation in vacuo to obtain 2-(N-acetyl-N-acetoxyamino-acetyl chloride (N.M.R. spectrum is devoid of acidic protons and exhibits absorption at 2.11 $\delta$ (3 protons), 2.24 $\delta$ (3 protons) and 4.80 $\delta$ (2 protons)). Add the acyl chloride dissolved in 20 ml. methylene chloride in a solution of 2.14 g. of 2-amino-5-chlorobenzophenone dissolved in 20 ml. of methylene chloride. Stir the reaction mixture for 30 minutes at 27° then heat to reflux and stir for 10 minutes. Remove the solvent in vacuo, triturate the residue with ethanol and filter to obtain 2[2-(N-acetoxyacetamido) acetamido]-5- chlorobenzophenone, 2,6 g. (72% yield), M.P. 150–152° C.

The following examples further illustrate the process of the invention and the method for preparing the compositions of the invention.

EXAMPLE 2

Warm a mixture of hydroxyaminoacetic acid (200 mg.) and 10 ml. acetic acid anhydride on a steam bath for 15 minutes and then concentrate the resulting solution on a rotary evaporator under reduced pressure. Dissolve the oily residue in 5 ml. 1,2-dimethoxyethane and add a solution of 510 mg. of 2-amino-5-chlorobenzophenone in 5 ml. of the same solvent. Heat the mixture at reflux temperature and then remove the solvent under reduced pressure. Dissolve the oily residue in ether. Obtain 2-[2-(N-acetoxyacetamido)acetamido]-5-chlorobenzophenone (M.P. 146–149° C.) by fractional crystallization (the second fraction contains the desired product).

EXAMPLE 3

To hydroxyaminoacetic acid (2.0 g.) slurried in 30 ml. glacial acetic acid, add 5.3 ml. of acetic anhydride. Heat the mixture at 50° C., for 25 minutes under a nitrogen atmosphere with stirring. Remove the solvent under reduced pressure. Extract the soluble material from the residue with 75 ml. of hot ether. Filter out the undissolved amphorous material and allow to cool. 2-N-Acetyl-N-acetoxyaminoacetic acid crystallizes in the form of colorless needles, M.P. 110–113° C. The infrared spectrum of the product exhibits carbonyl absorption at 5.59, 5.85, and 6.01$\mu$. The nuclear magnetic resonance spectrum shows methyl singlets at 2.10 and 2.22 and a methylene singlet at 4.45.

EXAMPLE 4

Disperse 2-(N-acetyl-N-acetoxyamino)acetic acid (1.0 g.) in 40 ml. of methylene chloride and add 1.5 g. of phosphorus pentachloride while maintaining the temperature at 5° C. Stir the mixture for 30 minutes at 5° C. after the addition is complete. Allow to settle and decant the supernatant liquid, which contains the product 2-(N-acetyl-N-acetoxyamino)acetyl chloride. Add the solution of substituted acetyl chloride to 1.32 g. of 2-amino-5-chlorobenzophenone dissolved in 20 ml. of methylene chloride. Add 0.7 ml. of triethylamine dropwise and stir for 10 minutes at 27° C. Pour the reaction mixture into ice water. Extract with several portions of methylene chloride. Combine the extracts, wash with water, dry over anhydrous magnesium sulfate and remove the solvent under reduced pressure. Triturate the residue with hot hexane, slurry in ether and filter. Recrystallize the product from a methylene chloride-ethanol mixture to obtain crystalline 2-(N-acetyl - N - acetoxyaminoacetamido)-5-chlorobenzophenone (0.6 g.), M.P. 149–151° C.

EXAMPLE 5

Heat a mixture of 1.0 g. hydroxyaminoacetic acid and 15 ml. of acetyl chloride at reflux for 3 hours. Remove excess acetyl chloride by evaporation under reduced pressure. Dissolve the residue in methylene chloride and add it to a solution of 2.31 g. of 2-amino - 5 - chlorobenzophenone dissolved in methylene chloride. Stir for 15 minutes, remove the solvent under reduced pressure, and recrystallize from absolute ethanol is obtain 0.8 g. of 2 - [N - acetoxyacetamido - acetamido] - 5 - chlorobenzophenone, M.P. 145–147° C.

EXAMPLE 6

Add N-hydroxyaminoacetic acid (9.11 g., 0.10 mole) to a solution of 22.5 g. (0.22 mole) of acetic anhydride in 30 ml. of ethylene dichloride at 20–30°. Heat the mixture at 65° with stirring for 1.5 hour, cool the amber liquid to 25° and treat dropwise with 33 ml. (53.5 g., 0.45 mole) of thionyl chloride. Maintain the temperature of the reaction mixture at 25° during the addition and then elevate slowly to 45° for 15 minutes. Concentrate the orange solution in vacuo; wash the residual oil 3 times with petroleum ether, treat with benzene, and reconcentrate in vacuo. Dissolve the residue to 90 ml. benzene and add to a solution of 19.5 g. (0.084 mole) 2 - amino - 5 - chlorobenzophenone in 90 ml. of benzene. Stir the mixture for one hour at 25°. Add anhydrous sodium acetate (6.9 g.) to the mixture and continue stirring for one hour. Concentrate the mixture in vacuo, treat with 300 ml. ethanol 2B, and reconcentrate in vacuo. Treat the residue with 60 ml. ethanol 2B and chill to 5° for 5 hours. An off-white solid separates which is filtered and washed with ethanol and water to give 21.5 g. (66%) of 2 - (N - acetyl - N - acetoxyamino-acetamido) - 5 - chlorobenzophenone, M.P. 150–151° C.

EXAMPLE 7

In a (2.1) 3-neck flask fitted with stirrer, thermometer, nitrogen inlet, powder funnel, and reflux condenser, heat to 65° C. a mixture of (208 ml., 225 g., 2.2 moles) of acetic anhydride and (5 ml.) of glacial acetic acid under a nitrogen atmosphere. Then add rapidly at 63–65° C. (27.3 g., 0.30 mole) of N-hydroxyaminoacetic acid with stirring; very slight heat of reaction is observed.

When the hydroxyaminoacetic acid has reacted as shown by a clear solution (approximately 15 minutes) add 63.0 g., 0.70 mole of N-hydroxyaminoacetic acid in small portions at 63–65° C. as fast as it reacts; occasional cooling is required and the addition requires 50 minutes. After allowing the clear red-brown reaction mixture to stir at 63–65° C. for an additional 15 minutes, cool to 25–30° C. under nitrogen and add 300 ml. of methylene chloride.

To the clear solution, add dropwise over 35 minutes (242 ml., 394 g., 3.3 moles) of thionyl chloride; during the addition, evolution of HCl cools the mixture and considerable heat is required to maintain the temperature at 15–25° C.

When the addition is complete, heat the solution to reflux (35 minutes) and maintain a gentle reflux (41–44° C.) for 15 minutes. Cool the turbid, red solution to 20–30° C. under nitrogen and concentrate with stirring under vacuum in a 50° water bath until no more distils at 120 mm. pressure and the internal temperature rises to 45° C. to remove acetyl chloride, thionyl chloride, HCl, $SO_2$, and methylene chloride completely.

Wash the fluid residue 3 times with hexane (250 ml.) under a nitrogen atmosphere, each time stirring well, allowing to settle, and removing the top hexane layer by suction.

Dissolve the residue in 350 ml. of benzene and decant from a small quantity of tarry material. Add this solution with stirring under a nitrogen atmosphere to a suspension of (195 g., 0.84 mole) 2-amino-5-chlorobenzophenone in 550 ml. of benzene at 15–18° C.; heat-of-reaction requires ice-bath cooling, particularly during the first two-thirds of the addition; the addition requires 10 minutes.

If crystallization has not begun when the addition is complete, seed the mixture with 2-(N-acetyl-N-acetoxy-amino-acetamido)-5-chlorobenzophenone; crystallization begins within 5 minutes. After stirring at 15–18° C. for 1.5 hour, add 105 g. of anhydrous sodium acetate. Allow to stir overnight at 18–25° C.

Cool the mixture to 8–10° C. and allow to stir for at least one hour. Collect the pale tan-colored crude by filtration and wash with 150 ml. of cold ethanol 2B. Wash the wet crude by stirring for 10 minutes in 480 ml. of ethanol 2B at 20–25° C., and filtering. Re-wash the wet crude to remove sodium acetate and chloride by stirring in 1,500 ml. of water for 10 minutes at 15–25° C., filtering, and drying the cream-colored product in a vacuum at 35–40° C. to obtain 2-(N-acetyl-N-acetoxy-amino-acetamido) - 5 - chlorobenzophenone 188 g. (as a crude product M.P. 142–147° C.).

The subject matter which the applicants regard as their invention is particularly pointed out and distinctly claimed as follows:

1. 2-(N-acetyl-N-acetoxyamino)acetyl chloride.

References Cited

UNITED STATES PATENTS

| | | | |
|---|---|---|---|
| 2,361,552 | 10/1944 | Lichty | 260—544 Y |
| 961,385 | 6/1910 | Taub | 260—544 Y |

FOREIGN PATENTS

| | | | |
|---|---|---|---|
| 1,320,265 | 3/1962 | France | 260—534 O |

OTHER REFERENCES

Chemistry of Organic Compounds, Carl R. Noller, 3rd edition, pp. 189, 182.

LORRAINE A. WEINBERGER, Primary Examiner.

J. L. DAVISON, Assistant Examiner.

U.S. Cl. X.R.

260—545 R, 534 R